UNITED STATES PATENT OFFICE.

JOHN E. FURBER, OF LAWRENCE, MASSACHUSETTS.

LIQUID SUBSTITUTE FOR EGGS.

SPECIFICATION forming part of Letters Patent No. 471,236, dated March 22, 1892.

Application filed October 29, 1891. Serial No. 410,159. (No specimens.)

*To all whom it may concern:*

Be it known that I, JOHN E. FURBER, a citizen of the United States, residing at Lawrence, in the county of Essex and State of Massachusetts, have invented certain new and useful Improvements in a Liquid Compound as a Substitute for Eggs; and I do hereby declare the following to be a full, clear, and exact description of the invention, such as will enable others skilled in the art to which it appertains to make and use the same.

This invention relates to an improved article of manufacture—a liquid compound—which is to be used as a substitute for eggs in cooking or for other purposes where eggs are required.

Hitherto it has been customary to form an egg substitute with a powder which contains the substantial equivalents of the ingredients of an egg, both the yelk and white. The said powders are then to be thoroughly mixed. A proper amount of liquid is then added and they are subsequently incorporated in the material, which requires their addition to produce the desired result. In practice I have found it preferable on many accounts to employ a liquid substitute in lieu of the powder substitute for eggs. Hence my invention is to embody, in a liquid compound, two fluids, which represent, respectively, the two principal component parts of an egg—viz., the yelk and the white.

My substitute for the yelk of an egg in liquid form is composed of the following ingredients: soluble albumen, water, oil, chloride of sodium, (NaCl,) and bicarbonate of soda, (NaHCO$_3$,) with a small quantity of coloring-matter. These ingredients represent the equivalents of the yelk of an egg, which, by analysis, is found to be composed of water, albumen, fatty matter, termed "vittiline," and mineral salts in proper proportions. I compound the above ingredients in substantially the same proportions as exist in the yelk of an egg and as follows: thirty-four pounds albumen, fifty-five pounds water, fifty-six pounds oil, eight and five-tenths ounces of chloride of sodium, and eleven and two-tenths ounces of bicarbonate of soda.

To properly combine the above elements, I proceed to make an emulsion as follows: dissolve the albumen in one-half the quantity of water in the formula—say twenty-seven pounds—having previously dissolved the salts (NaCl) and (NaHCO$_3$) in said water. Then gradually add the oil, and after the emulsification is effected add the remaining quantity of water slowly and stir thoroughly. Proper coloring-matter may then be added. In the use of oil preference is given to cotton-seed oil; but olive or other suitable fats, animal or vegetable, may be employed with equally good results.

The above completes the artificial yelk of the liquid compound, or "eggene," as it is termed; but as my invention is embodied in a liquid compound which is a complete equivalent of a natural egg the artificial white must now be produced and intermixed with the yelk to fully carry out my invention. To this end I compound an artificial liquid—white—with the following ingredients: albumen, water, chloride of sodium, and bicarbonate of soda. The same proportions are to be here maintained as exist in the white of a natural egg, which is composed of albumen, water, and mineral salts. The above ingredients I intermix in the following proportions: thirty pounds of soluble albumen, eighty-five pounds water, five and eight-tenths ounces NaCl, eight and five-tenths ounces NaHCO$_3$. When the albumen and salts are thoroughly dissolved in the water, the artificial white is in readiness to be incorporated with the yelk, and the two fluids are now combined in the proportions of one hundred and forty-four parts of the white to one hundred parts of the yelk. The white is to be added slowly to the yelk and mixed well. One gallon of this mixture is the equivalent of fourteen dozen eggs.

For purposes of economy in bulk the above liquid compound is made in a concentrated form. Hence when taken from the can or bottle for use said liquid is to be reduced one-half or united with an equal amount of water or milk, as the culinary or other operation requires.

In the above formulas I do not desire to be limited to the exact proportions of the materials as herein named, since they may be varied somewhat without necessarily departing from the spirit of my invention, which consists in producing a liquid compound which shall contain the equivalents for the yelk and white of a natural egg.

The directions for use of this liquid compound as a substitute for eggs are: Follow the usual receipt and take of the liquid an amount which shall be an equivalent for the eggs required by the receipt.

What I claim is—

As a liquid substitute for natural eggs, a liquid compound consisting of an emulsion made up of soluble albumen, water, animal or vegetable oil, chloride of sodium, and bicarbonate of soda, with suitable coloring-matter, combined in the proportions stated, with a second liquid composed of soluble albumen, water, chloride of sodium, and bicarbonate of soda, substantially as and for the purposes set forth and explained.

In testimony whereof I affix my signature in presence of two witnesses.

JOHN E. FURBER.

Witnesses:
WILBUR E. ROWELL,
A. R. SANBORN.